United States Patent [19]

Belolipetsky et al.

[11] 4,077,589
[45] Mar. 7, 1978

[54] GROUND-EFFECT LANDING GEAR FOR AIRCRAFT

[76] Inventors: Alexei Yakovlevich Belolipetsky, Kremenetskaya ulitsa, 3/11, kv. 65; Pavel Afanasievich Levochkin, ulitsa akademika Tupoleva, 26/16, kv. 27; Ivan Ivanovich Jurkovsky, ulitsa Dorogozhitskaya, 15b, kv. 51, all of Kiev, U.S.S.R.; Boris Makarovich Kolomiets, deceased, late of Kiev, U.S.S.R., by Lidia Vasilivna Kolomiets, administrator

[21] Appl. No.: 738,057

[22] Filed: Nov. 2, 1976

[51] Int. Cl.[2] .............................................. B60V 3/08
[52] U.S. Cl. ................................. 244/100 A; 180/119; 180/121; 244/102 R
[58] Field of Search .................... 244/23 R, 63, 100 R, 244/100 A, 102 R, 110 E; 180/116, 117, 119, 120, 121, 124, 125, 127, 128; 305/34; 280/DIG. 7

[56] References Cited

U.S. PATENT DOCUMENTS

| 3,275,270 | 9/1966 | Earl et al. | 180/116 |
| 3,513,933 | 5/1970 | Faure | 180/121 |
| 3,802,602 | 4/1974 | Wilson | 180/121 |
| 3,807,524 | 4/1974 | Taylor | 180/116 |
| 3,865,332 | 2/1975 | Coles | 244/102 R |

FOREIGN PATENT DOCUMENTS 1,493,337 7/1967 France ........................... 180/127

*Primary Examiner*—Trygve M. Blix
*Assistant Examiner*—Charles E. Frankfort
*Attorney, Agent, or Firm*—Fleit & Jacobson

[57] ABSTRACT

A ground-effect landing gear for use on aircraft intended for performing take-off and landing on unprepared soft ground comprises a platform mounting a flexible enclosure constructed in the form of a system of inflatable envelopes bounding an overpressure space near the ground surface. During transition to hovering and during movement of the aircraft the space is kept in communication with a compressed air source.

4 Claims, 3 Drawing Figures

GROUND-EFFECT LANDING GEAR FOR AIRCRAFT

BACKGROUND OF THE INVENTION

The present invention relates to aircraft takeoff and landing arrangements, more particularly to ground-effect landing gears. It can be used with particular advantage on aircraft intended for performing takeoff and landing on unprepared soft ground.

It is known that first in the world practice an attempt to use a ground-effect arrangement instead of a conventional wheeled undercarriage was made in the U.S.S.R. in the 1930s on an UT-2 (YT-2) airplane intended for performing takeoff and landing on unprepared soft ground.

In the U.S.A. a ground-effect landing gear was first produced by the Bell firm and mounted on a small LA-4 amphibian plane whose first flight was made in August 1967. However, this landing gear can be used only on paved surfaces or on water because the gas pressure of the air cushion involved exceeds the critical point as regards ground destruction.

In the present time research is carried out with the view of improving ground-effect landing gears so as to make them suitable for use on modern high-speed and high power/weight ratio aircraft.

Known in the prior art are ground-effect landing gears (see, for example, U.S. Pat. No. 3275270, class 244-110, the year 1966) comprising a platform mounting a flexible enclosure constructed in the form of a sytem of inflatable envelopes bounding an overpressure space near the ground surface. During transition to hovering and during movement of the aircraft said overpressure space is kept in communication with a source of compressed air.

In such ground-effect landing gears the flexible enclosure is constructed as an inflatable tube having a continuous toroidal form, as seen in plan, and attached to the lower surface of the aircraft fuselage.

During transition to hovering and during movement compressed air is supplied from the aircraft source first into the flexible enclosure for inflating same and then, after building up pressure above atmospheric, is discharged through a multiplicity of holes provided in the bottom portion of the enclosure around the perimeter thereof, whereby a circular air curtain is created which, in conjunction with the flexible enclosure, forms an air cushion space under the aircraft fuselage.

By virtue of said air curtain, when the ground surface is in sufficient proximity, the compressed air supplied into the air cushion space creates overpressure supporting the craft in the air.

In cruise the supply of compressed air into the flexible enclosure and air cushion space is discontinued and the enclosure is retracted into a hatch provided in the aircraft fuselage.

One of the main disadvantages of such ground-effect landing gears is that their use on medium and, particularly, heavy airplanes performing takeoff and landing on unpaved soft ground causes ground destruction and, consequently, substantial dust formation due to high-velocity air discharge from inside the inflatable enclosure and the air cushion space.

The landing gears under consideration also suffer from the disadvantage that the mean static pressure of compressed air inside the flexible enclosure has to be maintained much higher than that in the air cushion space, owing to which the deflection of the rear portion of the flexible enclosure caused by increase in the aircraft angle of attack at the end of the takeoff run gives rise to an enclosure righting moment which interferes with the increase in the angle of attack.

This condition makes it difficult to obtain optimum angles of attack during the takeoff run of the aircraft and thereby makes for increasing the takeoff run and the required length of the runway.

It is an object of the present invention to provide an aircraft ground-effect landing gear which will enable an aircraft of any weight category to take off and land without destroying the ground surface involved and, consequently, without considerable dust formation.

It is a further object of the present invention to provide an aircraft ground-effect landing gear which will enable the aircraft angle of attack to be varied during the takeoff run and thereby permit of decreasing the takeoff run and the required runway length.

It is a still further object of the present invention to provide a more compact ground-effect landing gear.

It is a still further object of the present invention to provide a ground-effect landing gear which will ensure directional stability of the aircraft throughout the takeoff and landing runs and at the same time will reduce dynamic loads on the taxi-ing wheels.

SUMMARY OF THE INVENTION

These and other objects are achieved in an aircraft ground-effect landing gear comprising a platform mounting a flexible enclosure constructed in the form of a system of inflatable envelopes bounding an overpressure space near the ground surface. During transition to hovering and during movement of the aircraft said overpressure space is kept in communication with a compressed air source.

According to the invention, the flexible enclosure is formed by an outer wall which is continuous in plan and attached around the perimeter of its upper edge to the platform, a flat bottom joined around the perimeter to the lower edge of said outer wall, and at least one circular partition mounted equidistantly from the outer wall in the space bounded by the outer wall, bottom and platform and arranged to divide said space into at least two concentric spaces communicating with each other. Mounted in the inner space of the latter equidistantly from the circular partition is the central portion of the flexible enclosure. Said central portion of the flexible enclosure divides the air cushion space into separate radial sections arranged so that they communicate successively with one another for the compressed air to pass from the rearward (as viewed in the direction of flight) sections into the adjacent forward sections.

With this construction of the flexible enclosure, the pressure differentials between the concentric spaces and between the peripheral space and the atmosphere can be brought to a comparatively low value suitable for take-off and landing on soft ground without ground destruction and dust formation.

This is made possible due to the fact that several areas of overpressure are created between the flexible enclosure and the ground surface. The overpressure in these areas decreases from the center of the enclosure toward the periphery thereof in accordance with the stepped drop of the pressure in the spaces of the portions of the enclosure, thereby making for considerable decrease in the velocity of the compressed air issuing from the air cushion space and thus preventing destruction of the ground surface.

Besides, the radial sectioning of the inner space with the provision far transfer of the compressed air from the rearward sections into the forward ones, i.e. in the direction of flight, makes possible some variation of the aircraft angle of attack during the takeoff run, the opposition to this variation from the flexible enclosure due to the deflection thereof being considerably lessened by reason of a softer enclosure construction. This feature is conductive to a material decrease in the takeoff run and, consequently, in the required runway length.

Inasmuch as there are no great pressure differentials between the spaces of the flexible enclosure and the associated overpressure areas in the air cushion, ground obstacles can be cleared with sufficient case. The radial sectioning of the inner space makes it possible to negotiate holes and ditches of considerable size.

It is desirable that the inner portion of the flexible enclosure be composed of separate torus-shaped elements mounted on the bottom and chordwise adjoining one another; two circular continuous in plan, partitions mounted between the platform and said torusshaped around their outer and inner perimeters; and radial partitions located chordwise between adjacent torus-shaped elements and provided with elastic non-return valves designed for interconnecting adjacent radial sections each of which is formed by one of the torus-shaped elements, the two associated radial partitions and the portions of said circular partitions adjacent to said torus and bounded by said radial partitions.

It is further desirable that a perforated circular partition be provided in the axial hole of each torus said partition being made in the form of a frustum of a cone whose large and small bases are attached around the peripheries thereof to the platform and the bottom respectively. It is still further desirable that the portion of the bottom bounded by the small base of the conic frustum be perforated for the air to pass from the appropriate section of the flexible enclosure into the space underneath the bottom. Such cone-shaped partitions will prevent the bottom from sagging.

If taxiing wheels are employed, each of them together with the associated strut and mounting elements is accommodated in the appropriate section and in a well provided thereabove in the aircraft fuselage. Mounted on the strut above the wheel is a rigid cap attached around the periphery thereof by means of a flexible shell to the lower edge of said well for the purpose of forming therein an airtight load chamber.

By this construction, the directional control and stability of the aircraft involved are maintained during movement by means of the taxiing wheels which are automatically loaded by air pressure built in the load chambers, the load being applied in accordance with the nature and condition of the runway surface and also in the event of asymmetric thrust.

Furthermore, the service life of the taxiing wheels is extended owing to the fact that the dynamic loads imposed thereupon are decreased materially on account of employing load chambers with a very flat load curve.

The advantages described herein make it possible to create an aircraft having a practically unlimited ability of travelling over any terrain and capable of performing takeoff and landing on any relatively even ground surface, including swamps, snow and sand.

BRIEF DESCRIPTION OF THE DRAWINGS

Now one of the possible embodiments of the invention will be described in detail with reference to the accompanying drawings in which.

DETAILED DESCRIPTION OF THE PREFERRED EMBODIMENT

The aircraft ground-effect landing gear comprises a platform 1 (FIG. 1) by means of which it is mounted to the lower surface of the aircraft fuselage 2.

The platform 1 mounts a flexible enclosure 3 constructed in the form of a system of inflatable envelopes made of a soft airtight material and arranged to bound an overpressure space 4 of an air cushion. Said overpressure space 4 is adapted to communicate during transition to hovering and during movement of the aircraft with the aircraft compressed air source (not shown) for the purpose of creating underneath the aircraft, near the ground surface, an area of overpressure.

Figure 2:
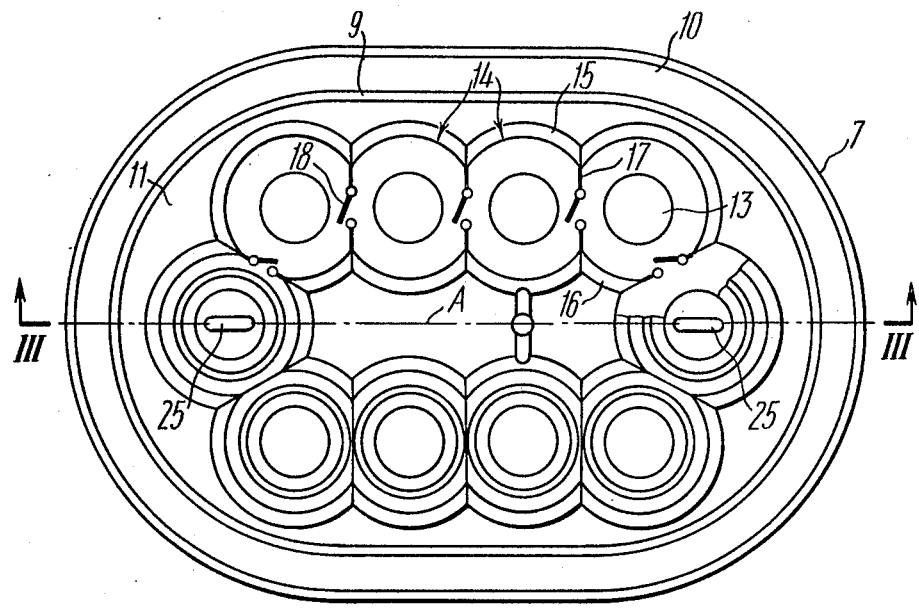
FIG. 2 is a partially cutaway top view of the ground-effect landing gear (the platform is not shown).

The platform 1 is formed by two actuating mechanisms mounted to the sides of the fuselage 2 in symmetry with its longitudinal axis "A" (FIG. 2).

Each actuating mechanism consists of four flaps 6 hinged to one another and arranged along the fuselage sides so that in flight they can be folded up together with the flexible enclosure 3 attached thereto.

The drive system (not shown) of the actuating mechanism may be constructed according to any design known in the art, for example, a system of cables may be employed.

According to the invention, the flexible enclosure 3 is formed by an outer wall 7 (FIGS. 1 and 2) which is continuous in the plan view and attached around the perimeter of the upper edge to the platform 1, any by a substantially horizontal, flat bottom 8 attached around its perimeter to the lower edge of the outer wall 7.

In the space formed by the outer wall 7 and the bottom 8 is mounted a circular partition 9 which is located equidistantly from said outer wall 7 and is arranged to divide said space into at least two spaces that is a peripheral space 10 (FIG. 2) and an inner space 11 adapted to communicate with each other by means of orifices 12 (FIG. 1) provided in the circular partition 9 and spaced equidistantly around the periphery thereof.

Identical orifices 12 are provided in the flaps 6 of the both actuating mechanisms.

Any number of circular partitions 9 may be used, depending on the weight category of the aircraft involded.

The central portion of the flexible enclosure 3 is mounted between the platform 1 and the bottom 8 in said inner space 11 of the flexible enclosure 3, equidistantly from the outer wall 7, and is arranged so that the space 11 is divided into separate radial sections 13 adapted to communicate with the space underneath the bottom 8.

More specifically, the central portion of the flexible enclosure 3 is composed of separate inflatable torus-shaped elements 14 (FIGS. 1 and 2) mounted on the bottom 8 and chordwise adjoining one another, and of two continuous circular partitions 15 and 16 mounted between the platform 1 and said torus-shaped elements 14 around their outer and inner perimeters respectively. Located chord-wise between adjacent torus-shaped elements 14 are radial partitions 17 which are provided with non-return valves 18 designed to interconnect adjacent radial sections 13.

Each section 13 is formed by one of the torus-shaped elements 14, the two associated radial partitions 17 and the portions of the circular partitions 15 and 16 adjacent to said torus-shaped elements 14 and bounded by said radial partitions 17.

Figure 3:
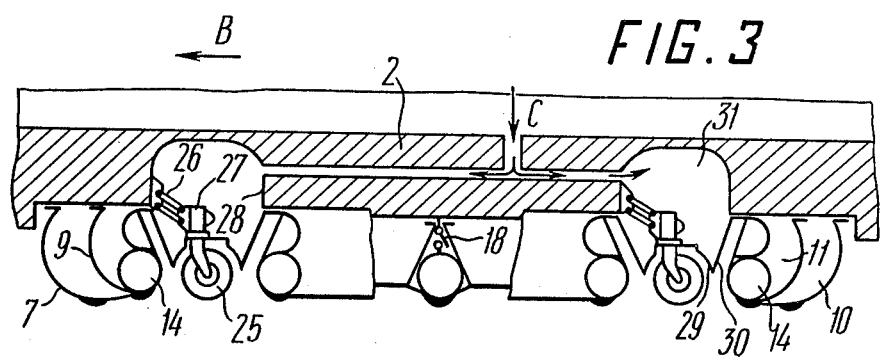
FIG. 3 is a longitudinal section on the airplane axis of symmetry (section on the line III—III of FIG. 2).

The non-return valves 18 are installed in the radial partitions 17 in such a manner that they permit the compressed air to flow from the rearward sections 13 of the space 11 into the forward sections 13, as viewed in the direction of flight shown by the arrow "B" in FIG. 3.

Owing to this constructional feature, the flexible enclosure 3 is rendered softer and its opposition to increase in the aircraft angle of attack at the end of the takeoff run is reduced as compared with the ground-effect landing gears known in the prior art, which makes it possible to materially decrease the takeoff run and the required runway length.

Each section 13 of the space 11 communicates by means of through passages 19 (FIG. 1) provided in the flaps 6 with corresponding chambers 20 formed by said flaps 6, the under surface 21 of the fuselage 2, and flexible walls 22. In turn, the chambers 20 are connected to the compressed air source (not shown).

In each passage 19 is fitted a throttle valve 23.

In the axial hole of each torus-shaped element 13 is mounted a perforated circular partition 24 constructed in the form of a frustum cone whose large and small bases are attached around the peripheries thereof, respectively, to the appropriate flaps 6 of the platform 1 and the bottom 8 of the enclosure 3.

Figure 1:
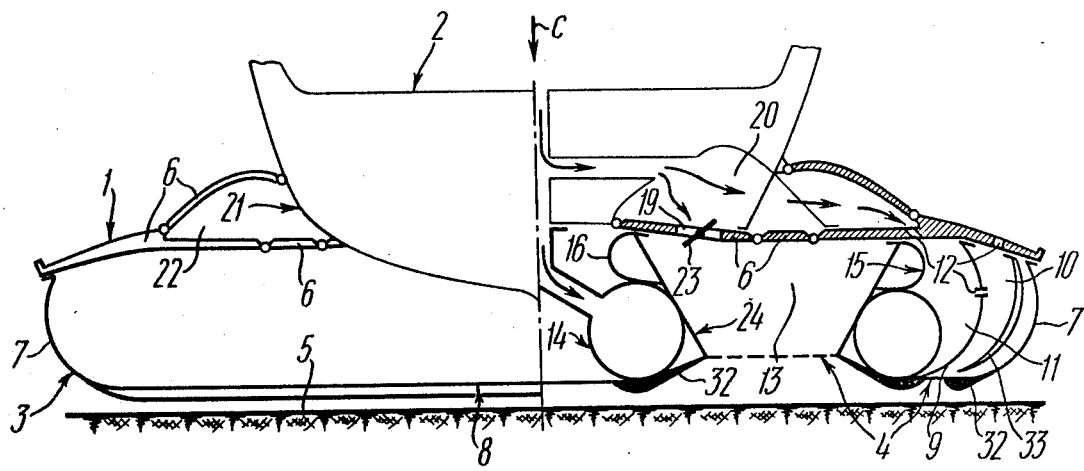
FIG. 1 shows the ground-effect landing gear in the extended portion (front view, partial cross section).

The portion of the bottom 8 bounded by the small base of the conic frustum is perforated, as shown by a broken line in FIG. 1, for the air to pass from the section 13 into the space underneath the bottom 8, which space, when in proximity to the ground surface 5, also forms part of the air cushion.

Circular conical partitions 24 serve as braces holding the bottom 8 in a horizontal position.

The landing gear has two taxiing wheels 25 (FIGS. 2 and 3) mounted in the front and rear sections 13 whose lower side is open and bonded by the torus-shaped elements 14 located on the aircraft axis of symmetry (the line "A" in FIG. 2).

Mounting elements 26 (FIG. 3), which secure each wheel 25 to the fuselage 2, and the upper part of the wheel strut 27 are located in a well 28 provided in the fuselage 2 above the corresponding section 13. Mounted on the strut 27 above each wheel 25 is a rigid metal cap 29 attached around the periphery thereof by means of flexible shell 30 to the lower edge of said well 28 for the purpose of forming therein an airtight load chamber.

Attached to the under surface of the bottom 8 of the flexible enclosure 3 are - circular bands of a protector 32 (FIG. 1). These bands are located around the periphery of the bottom 8 and around the perimeter of the enclosure central portion formed by the torus-shaped elements 14.

Mounted on the flaps 6 of the platform 1 between the outer wall 7 and the inner partition 9 of the flexible enclosure 3 are inflatable parking pads 33 designed for the aircraft to bear upon when parked.

The aircraft ground-effect landing gear which constitutes the present invention operates as follows:

Before takeoff and landing compressed air from the air-craft source is delivered as shown by the arrows "C" in FIG. 1 into the chambers 20 and thence first into the inner space 11 and then into the peripheral space 10 of the elastic enclosure 3. On inflating the enclosure, the air discharges through the holes in the outer wall 7 into the atmosphere.

Under these conditions stepped pressure drop occurs between said spaces 11, 10 and the atmosphere, the pressure dropping from the centre of the enclosure toward the periphery thereof and the amount of the pressure drop being suitable for aircraft operation of soft ground without its destruction and considerable dust formation.

While being supplied into the spaces 11 and 10 of the enclosure 3, the compressed air fills the torus-shaped elements 14 and the load chambers 31 (FIG. 3).

Thereafter the throttle valves 23 are opened and the compressed air feeds from the chambers 20 via the passages 19 in the flaps 6 into the sections 13 of the space 11 and thence, via the holes in the bottom 8, into the space 4 underneath the bottom 8, thereby creating under the aircraft, near the ground surface 5, an area of overpressure supporting the weight of the aircraft during takeoff and landing. It will be noted that several areas of overpressure are created in the air cushion space 4 underneath the bottom 8 of the flexible enclosure 3, the overpressure in said areas decreasing from the centre of the flexible enclosure 3 toward the periphery thereof in accordance with the stepped drop of pressure in the enclosure spaces 11, 10 and in the sections 13.

Due to the reasons described above, the velocity of the air discharge from the air cushion space 4 is sufficiently low to obviate destruction of an unpaved runway ground surface and consequent considerable dust formation.

Therefore, aircraft employing the ground-effect landing gear constructed according to the present invention can perform takeoff and landing on any ground surface, including swamps, snow and sand.

When the aircraft angle of attack increases during takeoff, the rear part of the elastic enclosure 3 (looking in the direction of flight indicated by the arrow "B" in FIG. 3) is deflected readily due to the fact that there are comparatively low pressures in the inner space 11 and peripheral space 10 of the enclosure outer portion and also owing to the provision of the non-return valves 18 in the radial partitions 17 mounted in the enclosure central portion. When the rear parts of the elastic enclosure 3 are deflected, the valves 18 open and thereby pass the air from the rearward sections 13 into the forward ones, as viewed in the direction of flight indicated by the arrow "B" in FIG. 3, the pressures in all the sections 13 becoming equalized.

Unsticking and touchdown are performed with the taxiing wheels 25 up. The whells 25 are retracted during the takeoff run and extended during the landing run at a certain speed of the aircraft travel.

To brake the aircraft, the throttle valve 23 is partially closed and the air flow into the sections 13 and the air cushion space is thereby decreased. As a result, the hovering height above the ground surface 5 also decreases. When the protector 32 of the bottom 8 comes into contact with the ground surface 5, the resultant frictional drag brakes the aircraft.

The folding-up of the ground-effect landing gear after takeoff or at the end of the landing run commences with the retraction of the taxiing wheels 25. Then after the delivery of compressed air into the flexible enclosure 3 is discontinued, the latter is folded up together with the flaps 6 and is stowed by the action of said flaps in the appropriate wells (not shown) provided in the aircraft fuselage 2.

For parking, compressed air is supplied into the pads 33 for the latter to support the aircraft. The aircraft can be lowered and lifted by varying the pressure in the pads 33.

What is claimed is:

1. An aircraft ground-effect landing gear comprising: a platform mounted to the aircraft; and a flexible enclosure constructed in the form of a system of inflatable envelopes attached to said platform and arranged to bound thereunderneath an overpressure space near the ground surface communicating during transition to hovering and during movement of the aircraft with a compressed air source said flexible enclosure being formed by: an outer wall which is continuous in the plan view and is attached around the perimeter of its upper edge to said platform, a flat bottom joined around the perimeter to the lower edge of said outer wall, and at least one circular partition mounted equidistantly from the outer wall in the space bounded by said outer wall, bottom and platform and arranged to divide said space into at least two concentric spaces communicating with each other; a lower edge of said circular partition and said flat bottom joined with said lower edge of said outer wall forming an inner portion of said flexible enclosure which is mounted in the space bounded by the circular partition and located equidistantly from the circular partition and also having means adapted to divide the air cushion space into separate radial sections arranged so that they communicate successively with one another for the compressed air to pass from the rearward sections as viewed in the direction of flight, into the adjacent forward sections.

2. An aircraft ground-effect landing gear as claimed in claim 1, in which the means adapted to divide the air cushion space into separate radial sections is formed by: separate torus-shaped elements mounted on the bottom and chordwise adjoining one another; two circular, continuous in plan, partitions mounted between the platform and said torus-shaped elements around their outer and inner perimeters, and radial partitions located chordwise between adjacent torus-shaped elements and provided with non-return valves designed to interconnect adjacent radial sections each of which is formed by one of the torus-shaped elements, the two associated radial partitions and the portions of said circular partitions adjacent to said torus-shaped element and bounded by said radial partitions.

3. An aircraft ground-effect landing gear as claimed in claim 2, in which in the axial hole of each torus-shaped element is provided a partition made in the form of a frustum of a cone whose large and small bases are attached around the peripheries thereof to the platform and the bottom respectively, the portion of the bottom bounded by the small base of the conic frustum being perforated for the air to pass from the appropriate radial section into the space underneath the bottom.

4. An aircraft ground-effect landing gear as claimed in claim 2, further comprising taxiing wheels wherein each of them together with the associated strut and mounting elements is accommodated in the appropriate section and in a well provided thereabove in the aircraft fuselage, there being provided a rigid cap mounted on the strut above the wheel and attached around the periphery by means of a flexible shell to the lower edge of said well for the purpose of forming therein an airtight load chamber.

* * * * *